(12) United States Patent
Martin Pina et al.

(10) Patent No.: US 11,623,569 B2
(45) Date of Patent: Apr. 11, 2023

(54) MECHANISM FOR ROTATING A SIDE MIRROR FOR VEHICLES AND SIDE MIRROR INCLUDING SAME

(71) Applicant: COMPAÑÍA LEVANTINA DE REDUCTORES, S.L., Ibi (ES)

(72) Inventors: Vicente Martin Pina, Ibi (ES); Arturo Picó Anotlí, Ibi (ES); Jorge Palacios Cortés, Ibi (ES); José Manuel Barroso Ossorio, Ibi (ES)

(73) Assignee: COMPAÑÍA LEVANTINA DE REDUCTORES, S.L., Ibi (ES)

( * ) Notice: Subject to any disclaimer, the term of this patent is extended or adjusted under 35 U.S.C. 154(b) by 64 days.

(21) Appl. No.: 17/433,359

(22) PCT Filed: Feb. 20, 2020

(86) PCT No.: PCT/ES2020/070126
§ 371 (c)(1),
(2) Date: Aug. 24, 2021

(87) PCT Pub. No.: WO2020/174108
PCT Pub. Date: Sep. 3, 2020

(65) Prior Publication Data
US 2022/0144170 A1    May 12, 2022

(30) Foreign Application Priority Data
Feb. 26, 2019   (ES) .............................. ESP201930173

(51) Int. Cl.
*B60R 1/074* (2006.01)

(52) U.S. Cl.
CPC .................................. *B60R 1/074* (2013.01)

(58) Field of Classification Search
CPC ....................................................... B60R 1/074
USPC .................................................. 359/841, 877
See application file for complete search history.

(56) References Cited

U.S. PATENT DOCUMENTS

| | | | | |
|---|---|---|---|---|
| 6,130,514 | A * | 10/2000 | Oesterholt | B60R 1/074 359/872 |
| 6,322,221 | B1 * | 11/2001 | van de Loo | B60R 1/074 359/872 |
| 7,533,997 | B2 * | 5/2009 | Onuki | B60R 1/074 359/877 |
| 7,547,855 | B2 * | 6/2009 | Brouwer | B60R 1/074 200/405 |
| 8,366,284 | B2 * | 2/2013 | Flynn | B60R 1/076 359/872 |
| 10,562,453 | B2 * | 2/2020 | van Stiphout | B60R 1/074 |
| 10,738,843 | B2 * | 8/2020 | Matthews | H02K 7/11 |
| 11,214,198 | B2 * | 1/2022 | Harris | B60R 1/074 |
| 11,396,264 | B2 * | 7/2022 | Peterson | B60R 1/074 |

(Continued)

*Primary Examiner* — Ricky D Shafer
(74) *Attorney, Agent, or Firm* — Benesch, Friedlander, Coplan & Aronoff LLP (57) ABSTRACT

The present invention refers to a rotating mechanism for an wing mirror, wherein this rotating mechanism enables the wing mirror to be moved, at least, between the positions habitually known as the park and drive positions in a motorised and/or manual manner, which has an elastic system on the independent lifting of the pressure system function for the union of the set of parts of the mechanism in the pivot element, having a set of simplified parts, for fewer costs and efficiency purposes.

7 Claims, 5 Drawing Sheets

(56) References Cited

U.S. PATENT DOCUMENTS

| | | | |
|---|---|---|---|
| 2007/0084707 A1* | 4/2007 | van den Brink | B60R 1/074 359/877 |
| 2013/0242423 A1* | 9/2013 | Palvoelgyi | G02B 7/1828 359/865 |
| 2013/0321941 A1* | 12/2013 | van Stiphout | B60R 1/06 359/877 |
| 2019/0092241 A1* | 3/2019 | Fujisaki | B60R 1/074 |

* cited by examiner

MECHANISM FOR ROTATING A SIDE MIRROR FOR VEHICLES AND SIDE MIRROR INCLUDING SAME

The present invention refers to a rotating mechanism for a wing mirror, wherein this rotating mechanism enables the wing mirror to be moved, at least, between the positions habitually known as the park and driving positions in a motorised and/or manual manner.

BACKGROUND OF THE INVENTION

Vehicle wing mirrors, as vehicle components, are subject to the requirements of minimising production costs and assembly times/costs.

These needs shown by the automotive sector in all its products related to the parts that make up the vehicle, mean that in the state of the art a multitude of sets of mirrors have been developed with designs that attempt to simplify both the parts and the number of such parts used, as well as the reliability and efficiency in their operation, and the ease and speed of assembly, in order to reduce the final cost of the wing mirror.

The known rotating mechanisms, which are therefore considered to be part of the known state of the art, are based on an actuator which, through the operation of an electric motor and a kinematic chain, transmits the movement to the fixed parts of the rotating shaft of the mirror, achieving this rotational displacement between the predetermined positions.

In order to achieve the positioning of the mirror in these angular positions, at least, in the driving and park positions, there are anchorage points between fixed parts and parts which rotate with respect to the previous. In the state of the art, complementary ramps and protuberances are used between these parts, which allow the anchorage positions to be changed through rotary movement.

This system of ramps and protuberances means that there is a longitudinal displacement parallel to the rotation shaft, in such a way that, in order to avoid the easy bridged of these ramps, as well as to maintain the set of parts used in the rotation movement in a compact way, there is an elastic element, usually a spring, which compresses all the parts of the rotating mechanism and presses so that the anchorage of both the crown or pinion that transmits the movement of the kinematic chain is not bridged, and in such a way that the anchorage of the position on the fixed base of the mirror is not bridged.

This configuration, which requires considerable pressure from the spring, which exerts force on the whole assembly and its different anchors of different sets of parts, requires considerable energy consumption in order to be able to make these turning movements that have to bridge the ramps in order to unanchor them and thus overcome the pressure of the spring.

It is also known in the state of the art the use of parts with bridgeable ramps in two directions of rotation, which can create, in case of an excess in the radius of rotation, a decoupling of the predetermined position or not reaching it correctly.

Finally, the known mechanisms also use different steps in the transmission of the rotary movement between parts that form anchorage sets, the step needing intermediate parts to be performed at a predetermined anchorage position. This requires a first positioning of the part that transmits the movement in said intermediate part so that, later, the set of the two former ones moves to anchor or leave the anchorage of the part that marks the predetermined operating positions of the wing mirror.

This implies the carrying out of at least two relative movements between two sets, resulting in a greater possibility of malfunctions, greater energy consumption and a greater number of parts, with the consequent increase in the price of the final product.

DESCRIPTION OF THE INVENTION

The objective of the present invention is to provide a wing mirror rotating mechanism for vehicles, as well as to provide a wing mirror that includes said rotating mechanism, which manages to solve the aforementioned inconveniences, presenting other advantages that will be described below.

For the purposes of this description, a lifting movement is defined as the longitudinal movement in a direction parallel to the rotation axis, usually vertical by the usual positioning of the mirrors and the usual systems of folding the mirror towards the body, wherein this longitudinal movement is made by the movement in the direction opposite to that of fixing the mirror to its base fixed to the vehicle.

Similarly, the usual operating positions of the wing mirror are those taken by the mirror when driving and when resting in a parked state. In driving mode, the mirror is, of course, unfolded, in a secure locked position that allows it to be seen from inside the vehicle. In parked mode, the mirror is folded towards the body protecting the mirror and decreasing the overall width of the vehicle in that static mode when it is not being driven. There is a possible counter-park position, wherein there is the possibility of turning it outwards in a way contrary to the turning from driving to park, wherein this position is used, mainly, as a safety measure against blows that the mirror may receive, or specific manual actions.

In accordance with this objective, according to a first aspect, the present invention provides a rotating mechanism for an wing mirror for vehicles, in which the motorised and/or manual movement of the mirror is carried out, at least, between the established functional positions of park and driving, pivoting on a shaft fixed jointly to the base of the wing mirror that is fixed in turn in the body/door of the vehicle.

The rotating mechanism has a motorised device for the transmission of the rotation movement through a kinematic chain to the traction parts installed on the fixed shaft that acts as a pivot. In this rotation movement, lifting movements of different parts of the mechanism are available to unlock the mirror from the functional positions in which it is fixed. There is also a spring or elastic element for compression of the assembly, which exerts longitudinal pressure on the locking position of the crown jointly with the rotation shaft.

The rotating mechanism is characterised in that it comprises, at least:

a casing, or box, that pivots with respect to the rotation shaft of the mirror and contains the rotating mechanism, or at least the elements that move jointly with the rotation of the rotating mechanism, wherein said casing has a surface that has protuberances or recesses in the form of a ramp, which come into contact with a pivoting base that is contiguous to a part/area for support that is at the base of the wing mirror;

a part or area for support that is fixed and joined to the base of the mirror, which has the pivoting base with which the surface of the casing comes into contact during its rotation, wherein the pivoting base has protuberances or recesses in the form of a ramp, in addition to those located on the surface of the casing;

a crown or pinion, which is part of the motion transmission kinematic chain, where the crown or pinion has a contact surface for anchorage in a retention element or part. This retention element or part does not move radially or longitudinally with respect to the crown or pinion. The anchorage between the contact surface of the crown and the retention element or part is carried out by means of protuberances or recesses in the form of a ramp, in a complementary way between one part and the other;

a retention element or part of a crown or pinion which is joint with the rotation shaft, not moving radially or longitudinally with respect to it, which has a contact surface with the crown with protuberances or recesses in the form of a ramp, in addition to those that are available in this contact surface with the crown or pinion.

In the previous configuration, it is characteristic that, between the casing or box that pivots on the rotation shaft and the retention element or part of the crown or pinion, there is a separation that allows the casing or box to be longitudinally displaced along said rotation shaft for its unlocking, bridging the corresponding ramps between surfaces in contact, having installed between them independent elastic means that exert pressure to maintain the original separation, without the elastic element or compression spring of the assembly intervening in the exertion of pressure for the union of these two elements, without direct or indirect pressure on the casing or box.

It is also characteristic of the configuration of the invention that the unlocking movement between the casing or box that pivots on the rotation shaft and the part or support area that is fixed, is carried out directly without intermediate parts that can have relative radial movement with respect to the casing or box.

Finally, it is also characteristic of the invention's configuration that the ramp-shaped recesses that can be located in the casing or box that pivots on the rotation shaft or located in the fixed part or support area, have a movement stop towards and in the direction of rotation of the casing or box towards the driving position, not bridgeable by ramp, as a way of interlocking in said driving position.

This configuration allows the lifting movement of the casing or box to be free from the action of the spring or compression element of the assembly, so that the motorised rotation movement between park and driving does not have to bridge the pressure of said spring or compression element of the assembly, so that the energy consumed in said movements is more reduced, since the element that carries out this pressure in the anchoring position of the casing at the base of the mirror is an elastic element unique to said casing and located between said casing and the crown retention part.

The spring acts by pressing the anchorage position of the crown or pinion on the part or retention element thereof, it maintains the pressure on the rest of the parts and especially on the positioning of the crown or pinion on the retention element or part, so that in motorised movements, it is not possible to unlock this union, while when manually taking the wing mirror to any of positions, with the motorised device locked, either by manual effort, the pressure of the compression spring is overcome, the union of the crown and retention part is unlocked and allows the wing mirror to be manually moved to any of the previous positions, park and driving, as well as to the counter-park position which is not usually reached in a motorised manner.

This means that independent pressure media are available for locking the crown and for locking the casing.

In an advantageous way, it is also necessary to configure the indicated invention, by carrying out a direct action between the casing or box that pivots on the rotation shaft and the part or support area that is fixed, intermediate extra parts are avoided with relative movement with them, simplifying the rotation movements between parts and therefore increasing simplicity and consequently reducing costs with respect to some known solutions.

According to a possible embodiment of the invention, the elastic means arranged between the casing or box that pivots on the rotation shaft and the retention element or part of the crown or pinion, are formed by a wave spring washer. This allows us to have the pressure element between the casing and its immediately superior part, the crown retention part, a pressure that can be calculated only for this union of this assembly and be lower than the pressure necessary to join the whole mechanism assembly as happens in the state of the art.

Depending on an embodiment of the invention, the casing or box has a surface that has protuberances that come into contact with the ramp-shaped recesses of the pivoting base. This preferred configuration allows the interlocking of the operating positions of the wing mirror, and allows it to be moved towards the other position, saving the ramps that lift the wing mirror.

According to another embodiment of the invention, which can be combined with the previous ones, the retention element or part of the crown or pinion has a surface that has protuberances that come into contact and are interlocked with the ramp-shaped recesses of this crown or pinion. In the same way, this configuration, also preferred, allows manual movement in the operating positions of the wing mirror, with the motorised device locked.

Preferably, the support surface on which the surface of the casing or box rotates, can be a separate part of the rotation shaft and the fixed base of the wing mirror, coupled together with at least one of them.

Alternatively, the support surface on which the surface of the casing or box rotates can be an integrated surface in the rotation shaft and/or the fixed base of the wing mirror.

According to a second aspect, the present invention proposes a wing mirror, which is characterised in that it includes a rotating mechanism as indicated in the present description. The resulting wing mirror achieves the lifting movement with reduced energy consumption, with greater simplicity of the parts that make up the mechanism and with the performance of direct movements and, therefore, with the need to perform fewer such movements for each movement between positions.

BRIEF DESCRIPTION OF THE DRAWINGS

In order to better understand the description made, a set of drawings has been provided which, schematically and solely by way of non-limiting example, represent a practical case of embodiment.

DESCRIPTION OF A PREFERRED EMBODIMENT

Below is a description of several embodiments of the rotating mechanism for wing mirror for vehicles, as well as of the wing mirror that includes this rotating mechanism of the present invention, making reference to the figures indicated above.

In the operation of the wing mirror (100) of this embodiment, its positioning is carried out in two positions in a motorised and manual manner—the driving position and parked position—, and it has a position which can exclusively be obtained with manual operation as it is the position of counter-park, but it can move from this to the driving position in a motorised manner.

Figure 1:
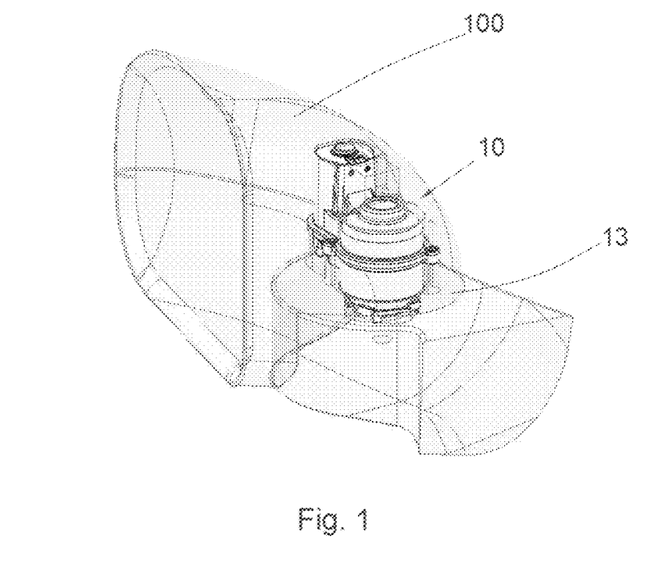
FIG. 1 is a perspective view of the rotating mechanism attached to the rotating mechanism, mounted on a wing mirror.
Figure 2:
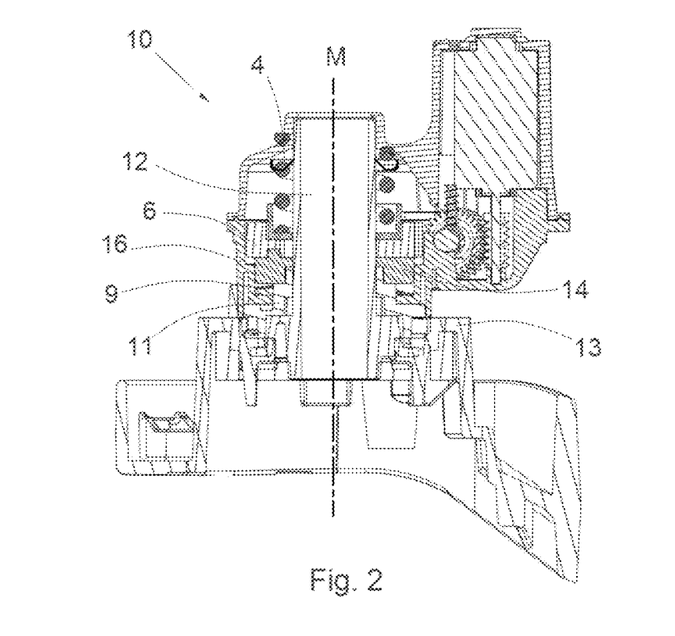
FIG. 2 is a longitudinal cross-sectional view of the rotation shaft of the different parts of a wing mirror rotating mechanism, attached to the wing mirror fixing mechanism.
Figure 3:
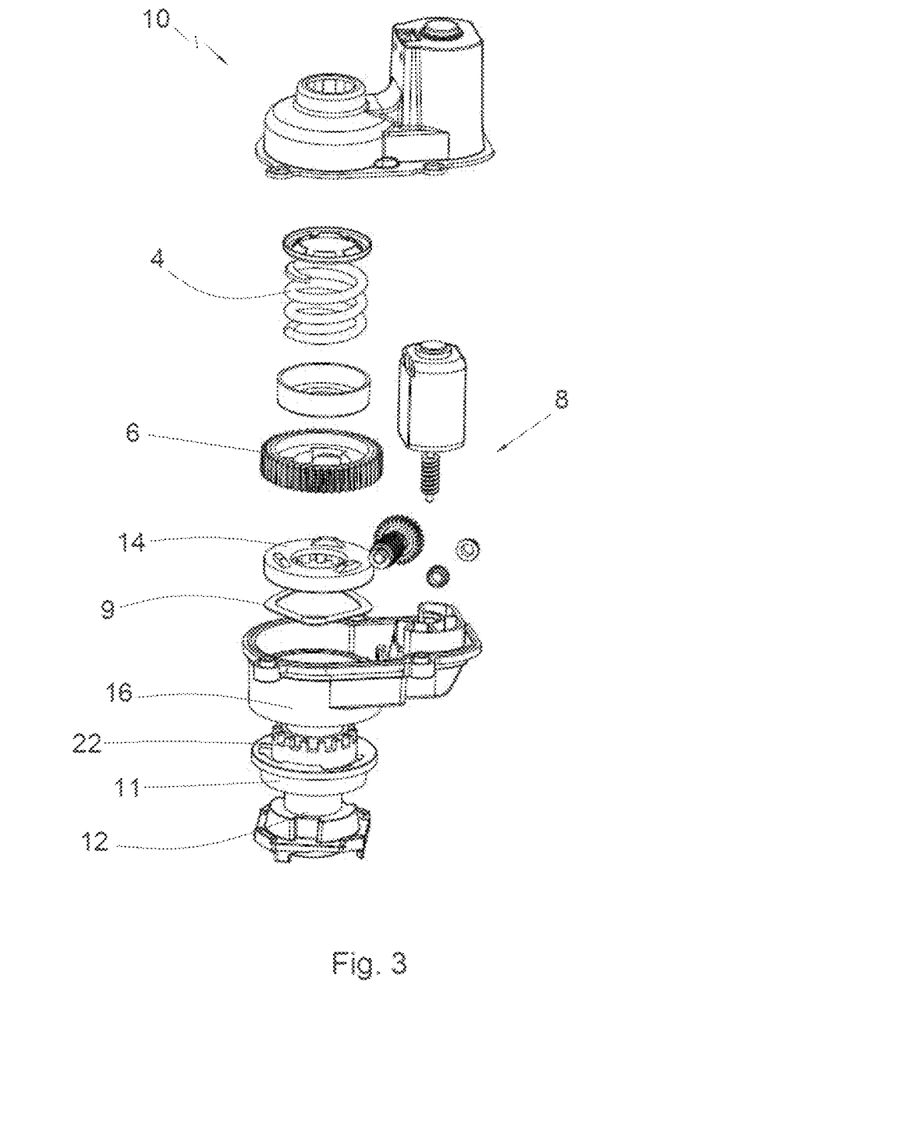
FIG. 3 is a exploded view of the rotating mechanism anchored in the fixing system.

The passage from one position to another of the wing mirror (100) is carried out thanks to the rotating mechanism (10) which integrates the wing mirror (100), as can be seen in FIGS. 1 to 3. This rotating mechanism (10) is mounted around a mounting assembly which is fixed to the base (13) of the wing mirror (100) and which in this case is formed by a rotation shaft as a pivot element (12), or shank, together with the fixed part (11) which is attached to this pivot element (12), which in turn is attached to the base (13) of the wing mirror (100).

The rotating mechanism (10) has a casing (16) containing the different elements that perform the function of the rotating mechanism (10). At the base of this casing (16), as can be seen in FIGS. 4 to 9, there is a surface with protuberances (18) that come into contact with the surface of the support part (11), which is fixed to the base (13) of the wing mirror (100). The support part (11) acts as a pivoting base with which the protuberances (18) come into contact in their rotation, this pivoting base having ramp-shaped recesses (19), complementary to the protuberances (18) in the surface of the casing (10).

Between the casing (16) and the next part mounted on it, which is a fixed retention part (14) of the crown (6), there is a gap (d) included in the longitudinal axis of assembly (M), where this gap (d) allows the longitudinal displacement of the casing (16), and therefore of the elements fixed thereto (16).

This longitudinal displacement occurs when the protuberances (18) of the casing (16) move in their rotation along the ramps (19) of the support part (11).

Between the casing (16) and the retention part (14) there is an elastic element in the form of a wave spring washer (9) which, when the casing (10) moves on the longitudinal axis of assembly (M) approaching the retention part (14), this washer (9) exerts a separating force between these parts (16-14) which favours the original, separated position.

The retention part (14) is fixed, being longitudinally and radially attached to the pivot element (12) by anchoring this retention part (14) in the fixed support part (11) which is also attached to the pivot element (12) and to the base (13) of the wing mirror. This solidarity is achieved by the coupling of the part (14) in the protuberances (22).

As can be seen in FIGS. 10 to 13, the retention part (14) has protuberances (30) into which the crown (6) fits, which (6) is pressed into its locking position with the retention part (14) by the action of spring pressure (4). To be able to unlock this locking position of the crown (6) in the retention part (14), the spring pressure must be overcome and the ramps forming the protuberances (30) must be bridged.

This action is carried out by manual means, since the rotation movement by means of the motorised device and its kinematic chain (8), is blocked in this direction of rotation towards the counter-parked position, by means of a rotation stop element (21). When performing the manual action of rotating the wing mirror (100) towards the counter-parked position, the casing (16) must be locked in that direction of rotation, when overcoming the resistance of the spring (4) and the protuberances (30) of the retention part (14), the crown is unlocked by lifting the casing (16), saving the stops (21) and proceeding to turn the mirror to the counter-parked position.

The pressure action of the spring (4) ends in the retention part (14) as this is fixed and has no longitudinal displacement, which means that it does not transmit pressure to the elements on the other side, such as the casing (16) which, as we have seen, has its own pressure element to fix the operating positions of the wing mirror (100) by means of the wavy washer (9).

Figure 4:
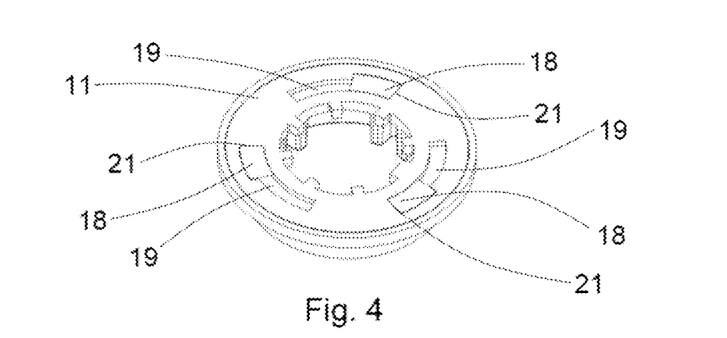
FIG. 4 is a perspective view of the positioning of the casing (represented only by the traces of its protuberances) on the support part on which it rotates with the wing mirror in its driving position.
Figure 5:
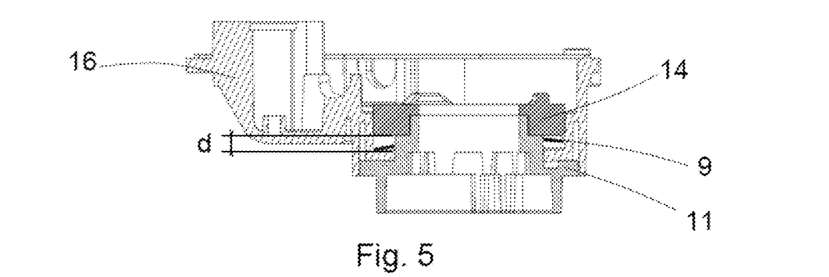
FIG. 5 is a partial view of the gap between the retention part, casing and support part at the base, in longitudinal section by the rotation shaft of the rotating mechanism with the wing mirror in its driving position.
Figure 6:
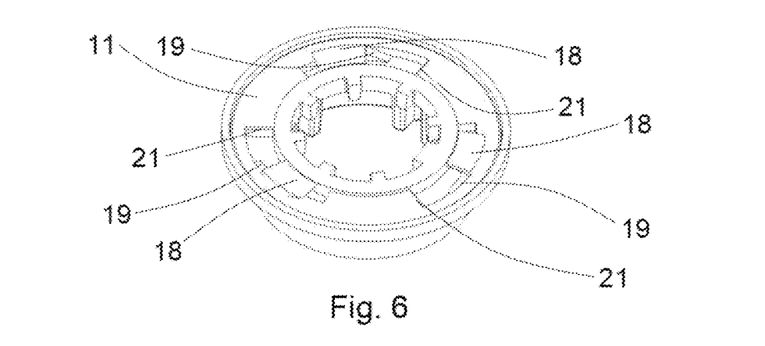
FIG. 6 is a perspective view of the positioning of the casing (represented only by the traces of its protuberances) on the support part on which it rotates with the wing mirror in its parked position.
Figure 7:
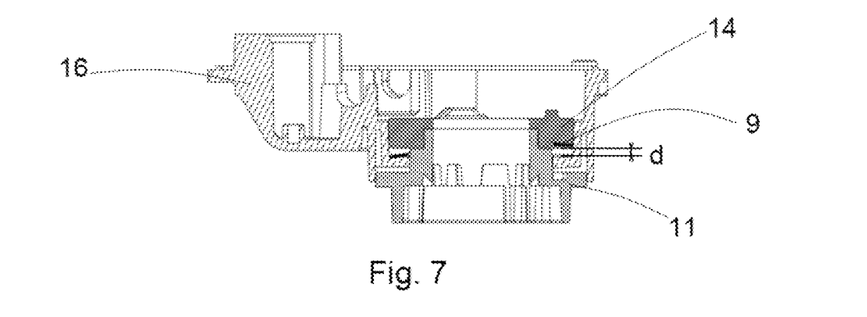
FIG. 7 is a partial view of the gap between the retention part, casing and support part at the base, in longitudinal section by the rotation axis of the rotating mechanism with the wing mirror in its parked position.
Figure 8:
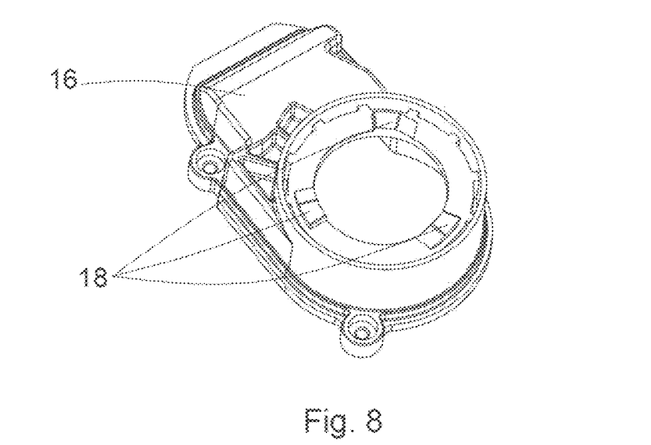
FIG. 8 is a bottom perspective view of the surface of the casing that makes contact with the support part on the turn.
Figure 9:
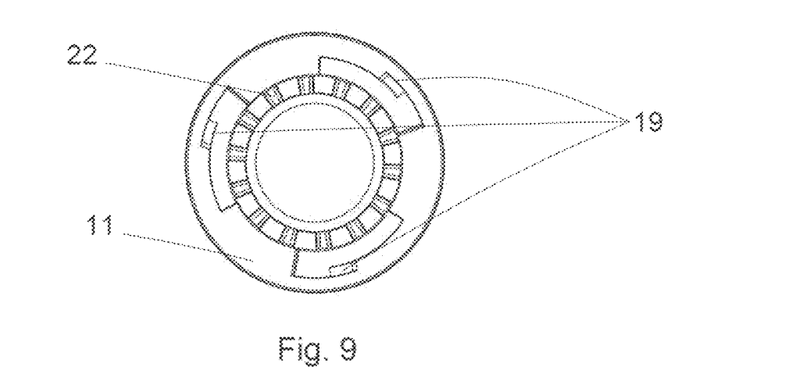
FIG. 9 is a plan view of the surface of the support part on which the surface of the casing rotates.
Figure 10:
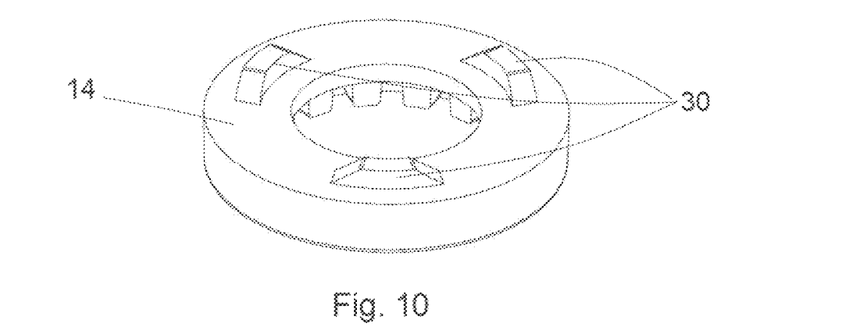
FIG. 10 is a perspective view of the surface of the retention part that makes contact with the crown to anchor the different positions in manual movements.
Figure 11:
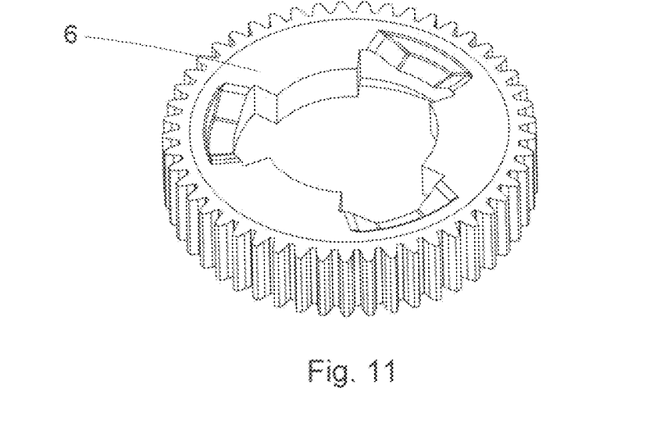
FIG. 11 is a bottom perspective view of the surface of the crown that makes contact with the retention part to anchor the different positions in manual movements.
Figure 12:
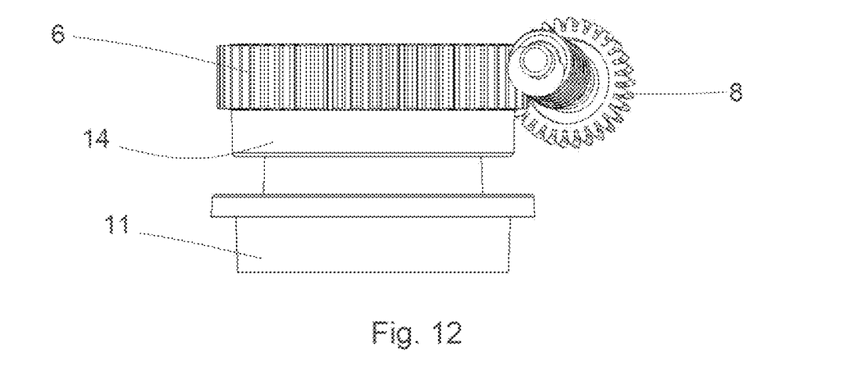
FIG. 12 is an elevated view of the detail of the crown-retention part assembly in a locking position in the operating position.
Figure 13:
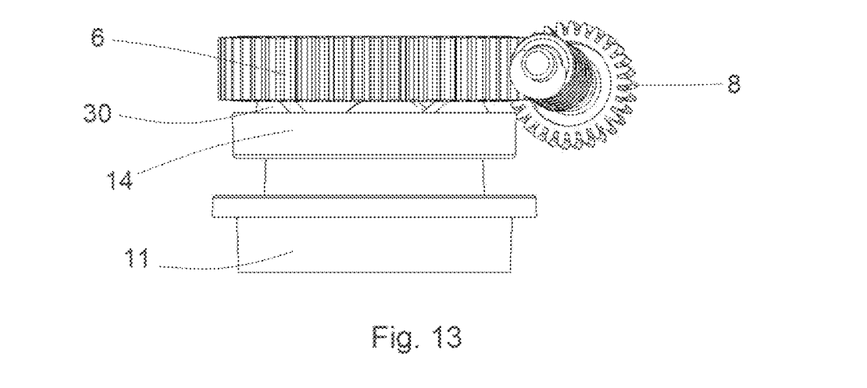
FIG. 13 is an elevated view of the detail of the crown-retention part assembly in a position in which an external force has been exerted on the wing mirror for its rotation.

In the motorised movement of the wing mirror (100), starting from the original driving position, as can be seen in FIGS. 4 and 5, the protuberances (18) of the casing (16) are located in the lower part of the ramps (19) wherein they have a direction of rotation blocked by stops (21) which prevent this rotation towards the counter-parked position, as indicated above. At this point, where the separation distance (d) between the casing (16) and the retention part (14) is maximum, the wave spring washer (9) is relaxed. This washer (9), as the casing (16) moves along the ramp (19) in the direction of rotation towards the parked position, will be pushed towards the retention part (14) and the washer (9) will exert pressure against the protuberances (18) of the casing (16) advancing along the ramp (19).

In the reverse movement, in which the motorised device (2, 8) rotates from the paragliding position to the driving position, the protuberances (18) must be moved by the casing (16) as it rotates along the ramps (19), until it reaches its stop position (21).

As an alternative embodiment to the above, the wave spring washer (9) could be replaced by a similar elastic system that allows it to be placed between the casing (16) and the retention part (14) of the crown (6).

Alternatively, parts that have protuberances to fit into additional recesses to fix positions can be exchanged for the reverse configuration and instead of having protuberances, have additional recesses and the other protuberances instead of recesses.

Alternatively, the support part (11) can form part of the pivot element (12) or the base (13) of the wing mirror (100)

Although reference has been made to a specific embodiment of the invention, it is evident to a person skilled in the art that the rotating mechanism for wing mirror for vehicles, as well as the wing mirror including the aforementioned rotating mechanism, is susceptible to numerous variations and modifications, and that all the details mentioned can be replaced by other technically equivalent ones, without departing from the scope of protection defined by the attached claims.

The invention claimed is:

1. Rotating mechanism for a wing mirror for vehicles, of which a motorized or manual movement of the mirror is carried out, at least, between an established functional positions of parking and driving, pivoting on a shaft (12) fixed jointly to the base (13) of the wing mirror (100) which in turn is fixed to a body or door of the vehicle, wherein the rotating mechanism (10) has a motorized device (8) for a transmission of the rotation movement through a kinematic chain to traction parts installed on the fixed shaft (12) which acts as a pivot, having lifting movements of different parts of the mechanism to unlock the mirror from the functional positions in which it is fixed and of a spring (4) or elastic pressure element which exerts longitudinal pressure on a locking position of a crown or pinion jointly with the shaft, characterised in that the rotating mechanism (10) comprises at least:

- a casing (16), or box, that pivots with respect to the shaft (12) of the mirror and contains the rotating mechanism (10), or at least elements that move jointly with the rotation of the rotating mechanism (10), wherein said casing (16) has a surface that has protuberances (18) or recesses in a form of a ramp that come into contact with a pivoting base that is attached to a part or area for support (11) at the base (13) of the wing mirror (100);
- the part or area for support that is fixed and joined to the base (13) of the wing mirror (100), which has the pivoting base with which the surface of the casing (16) comes into contact during its rotation, wherein the pivoting base has protuberances or recesses (19) in the form of a ramp, in addition to those located on the surface of the casing (16);
- the crown (6) or pinion, which is part of the motion transmission kinematic chain, where the crown (6) or pinion has a contact surface for anchoring in a retention element or part (14), wherein the retention element or part (14) does not radially or longitudinally move with respect to the crown (6) or pinion, wherein the anchorage between the contact surface of the crown (6) or pinion and the retention element or part (14) is carried out by means of protuberances or recesses (30) in the form of a ramp, in a complementary manner between one part and the other;
- the retention element or part (14) of the crown (6) or pinion which is joint with the shaft (12), not moving radially or longitudinally with respect to it, which has a contact surface with the crown with protuberances or recesses (30) in a form of a ramp, in addition to those that are available in the contact surface with the crown or pinion (6);
- wherein, between the casing (16) or box that pivots on the shaft (12) and the retention element or part (14) of the crown (6) or pinion, there is a separation (d) that allows the casing (16) or box to be longitudinally displaced along said shaft (12) for its unlocking, saving the corresponding ramps between surfaces in contact, having installed between them independent elastic means (9) that exert pressure to maintain an original separation, without the elastic means or spring (4) of the assembly intervening in an exertion of pressure for union of these two elements, without direct or indirect pressure on the casing (16) or box;
- wherein the unlocking movement between the casing (16) or box that pivots on the shaft (12) and the part (11) or area for support that is fixed, is carried out directly without intermediate parts that can have relative radial movement with respect to the casing (16) or box; and
- wherein the ramp-shaped recesses (19) of the pivoting base that can be located in the casing (16) or box that pivots on the shaft (12) or located in the part or area (11), have a movement stop (21) towards and in a direction of rotation of the casing or box towards the driving position, not bridgeable by a ramp, as a way of interlocking in said driving position.

2. Rotating mechanism for a wing mirror for vehicles, according to claim 1, wherein the elastic means (9) arranged between the casing (16) or box pivoting on the shaft (12) and the retention element or part (14) of the crown (6) or pinion, are formed by a wave spring washer.

3. Rotating mechanism for a wing mirror for vehicles, according to claim 1, wherein the casing (16) or box has a surface having protuberances (18) that come into contact with the recesses (19) in a form of a ramp from the pivoting base.

4. Rotating mechanism for a wing mirror for vehicles, according to claim 1, wherein the retention element (14) or part of the crown (6) or pinion has a surface having protuberances (30) that come into contact with and are interlocked with the ramp-shaped recesses of the crown (6) or pinion.

5. Rotating mechanism for a wing mirror for vehicles, according to claim 1, wherein the supporting surface on which the surface of the casing (16) or box rotates, is the part (11) independent of the shaft (12) and the base (13) of the wing mirror (100), coupled jointly to at least one of them.

6. Rotating mechanism for a wing mirror for vehicles, according to claim 1, wherein the supporting surface on which the surface of the casing (16) or box rotates, is a surface integrated in the shaft (12) or in the base (13) of the mirror.

7. A wing mirror, characterised in that it includes the rotating mechanism (10) as indicated in claim 1.

* * * * *